(12) United States Patent
Yang

(10) Patent No.: US 7,626,372 B2
(45) Date of Patent: Dec. 1, 2009

(54) CONTROL CIRCUIT FOR MULTI-PHASE, MULTI-CHANNELS PFC CONVERTER WITH VARIABLE SWITCHING FREQUENCY

(75) Inventor: Ta-Yung Yang, Milpitas, CA (US)

(73) Assignee: System General Corporation, Taipei (TW)

( * ) Notice: Subject to any disclaimer, the term of this patent is extended or adjusted under 35 U.S.C. 154(b) by 306 days.

(21) Appl. No.: 11/867,042

(22) Filed: Oct. 4, 2007

(65) Prior Publication Data

US 2009/0091304 A1    Apr. 9, 2009

(51) Int. Cl.
*G05F 1/70* (2006.01)
*G05F 1/63* (2006.01)

(52) U.S. Cl. .................. 323/285; 323/222; 323/225; 323/271

(58) Field of Classification Search ................. 323/205, 323/207, 212, 217, 222, 223, 225, 271, 272, 323/282, 284, 285, 288
See application file for complete search history.

(56) References Cited

U.S. PATENT DOCUMENTS

| | | | |
|---|---|---|---|
| 5,565,761 A * | 10/1996 | Hwang | 323/222 |
| 7,078,884 B2 * | 7/2006 | Miura et al. | 323/272 |
| 7,116,090 B1 | 10/2006 | Yang et al. | |
| 2007/0109825 A1 * | 5/2007 | Qiu et al. | 363/41 |
| 2007/0145956 A1 * | 6/2007 | Takeuchi | 323/207 |

* cited by examiner

*Primary Examiner*—Gary L Laxton
*Assistant Examiner*—Nusrat J Quddus
(74) *Attorney, Agent, or Firm*—Thomas, Kayden, Horstemeyer & Risley

(57) ABSTRACT

A switching control circuit for multi-phases PFC converters is provided. It includes a PFC-control circuit coupled to receive a first-inductor signal and a feedback signal for generating a first-switching signal. The first-switching signal is utilized to switch the first inductor for power factor correction. A phase-detection circuit detects the first-switching signal and a second-inductor signal for generating a start signal and a phase-lock signal. The start signal is developed to enable a second-switching signal. The second-switching signal is coupled to switch a second inductor. An on-time-adjust circuit is coupled to adjust the on time of the second-switching signal in accordance with the phase-lock signal. The phase-lock signal is correlated to the period between the end of the second-inductor signal and the start of the second-switching signal.

24 Claims, 14 Drawing Sheets

US 7,626,372 B2

CONTROL CIRCUIT FOR MULTI-PHASE, MULTI-CHANNELS PFC CONVERTER WITH VARIABLE SWITCHING FREQUENCY

BACKGROUND OF THE INVENTION

1. Field of the Invention

The invention relates to a switching power converter, and more particularly to a control circuit of power factor correction (PFC) converters.

2. Description of the Related Art

The high current demand normally decreases the power efficiency in the power converter. The power loss of the power converter is exponentially proportional to its current.

$$P_{LOSS} = I^2 \times R \tag{1}$$

where I is the switching current of the power converter, R is the impedance of the switching devices such as the equivalent resistance of the inductor and the transistor, etc.

Therefore, parallel technologies are developed for reducing the power consumption of power converter. The PFC (power factor correction) power converter is utilized to improve the power factor of AC power source. The detail skill of the PFC circuit can be found in prior arts, such as U.S. Pat. No. 7,116,090 "Switching control circuit for discontinuous mode PFC converters". The object of the present invention is to develop a control circuit for the parallel of PFC converters in order to improve the efficiency of the power supply. The number of parallel channels is no limit theoretically. Multi-phases technologies including synchronization and phase shift are designed to spread the switching noise and reduce the ripple.

BRIEF SUMMARY OF THE INVENTION

An exemplary embodiment of the invention provides a switching control circuit for multi-phases and multi-channels PFC converter. It includes a PFC-control circuit coupled to a first inductor and the output of the PFC converter to receive a first-inductor signal and a feedback signal for generating a first-switching signal. The first-switching signal is utilized to switch the first inductor for power factor correction. A phase-detection circuit detects the first-switching signal and a second-inductor signal for generating a start signal and a phase-lock signal. The start signal is generated in accordance with the switching period of the first-switching signal. The start signal is coupled to enable a second-switching signal. The second-switching signal is applied to switch a second inductor. An on-time-adjust circuit is developed to adjust the on time of the second-switching signal in accordance with the phase-lock signal. The on time of the second-switching signal is adjusted to minimize the period from the disabling of the second-switching inductor signal to the enabling of the second-switching signal. The first-inductor signal is correlated to the demagnetization of the first inductor. The second-inductor signal is correlated to the demagnetization of the second inductor. A light-load detection circuit generates an off signal for turning off the second-switching signal in response to the feedback signal. The light-load detection circuit further generates a range signal coupled to program the output voltage of the PFC converter in response to the off signal. A threshold signal of the light-load detection circuit is produced in accordance with the input voltage of the power converter. The threshold signal is applied to compare with the feedback signal for determining the light load state of the PFC converter and generating the off signal and the range signal.

A detailed description is given in the following embodiments with reference to the accompanying drawings.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
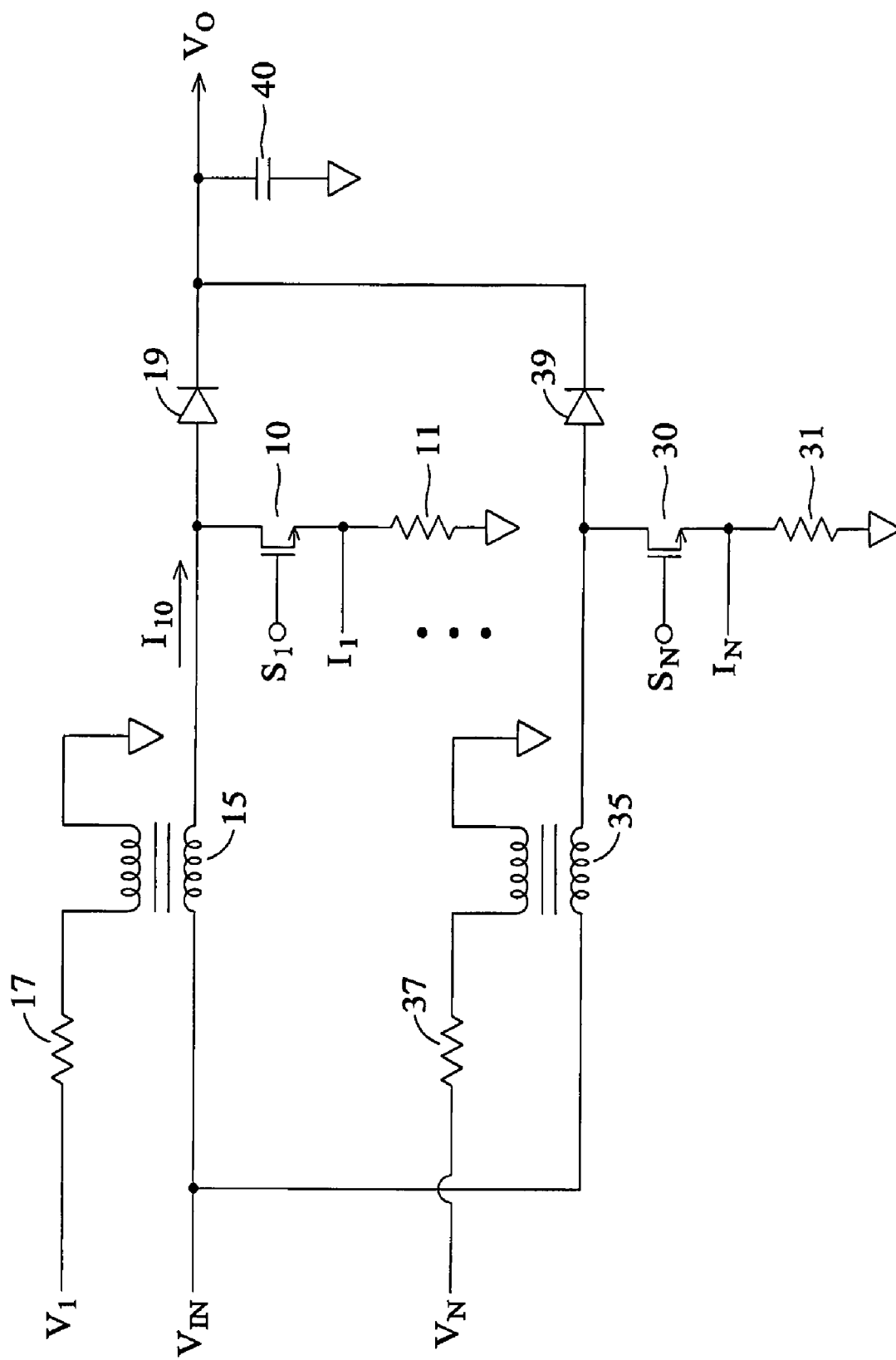
FIG. 1 shows a multi-phases, multi-channels PFC converter according to the preferred embodiment of the present invention.

FIG. 1 shows a preferred embodiment of parallel PFC converters according to the present invention. A transistor 10, an inductor 15 and a rectifier 19 develop a first power converter. A first-switching signal $S_1$ is coupled to control the transistor 10 for switching the inductor 15. The rectifier 19 and a capacitor 40 are utilized to generate the output voltage $V_O$ of the PFC converter. Another transistor 30, an inductor 35 and a rectifier 39 develop another power converter coupled to the output voltage $V_O$. A second-switching signal $S_N$ is coupled to control the transistor 30 for switching the inductor 35. The outputs of power converters are parallel connected. The inductors 15 and 35 are coupled to the output voltage $V_O$. The inductors 15 and 35 are further coupled to an input voltage $V_{IN}$. When the transistor 10 is turned on, a switching current $I_{10}$ is generated. It is given by, $$I_{10} = \frac{V_{IN}}{L_{15}} \times T_{ON-1} \qquad (2)$$

where the $L_{15}$ is the inductance of the inductor 15, $T_{ON-1}$ is the on time of the first-switching signal $S_1$, $V_{IN}$ is the amplitude of the input voltage $V_{IN}$.

A current-sense device such as a resistor 11 is coupled to sense the switching current $I_{10}$ for generating a first-current signal $I_1$. Another current-sense device such as a resistor 31 is coupled to sense the switching current of transistor 30 and generate a second-current signal $I_N$. The energy is stored into the inductor 15 when the transistor 10 is turned on. Once the transistor 10 is turned off, the energy will be delivered to the capacitor 40 through the rectifier 19. An auxiliary winding of the inductor 15 generates a first-inductor signal $V_1$ correlated to the demagnetization of the inductor 15. Besides, an auxiliary winding of the inductor 35 generates a second-inductor signal $V_N$ that is correlated to the demagnetization of the inductor 35.

Figure 2:
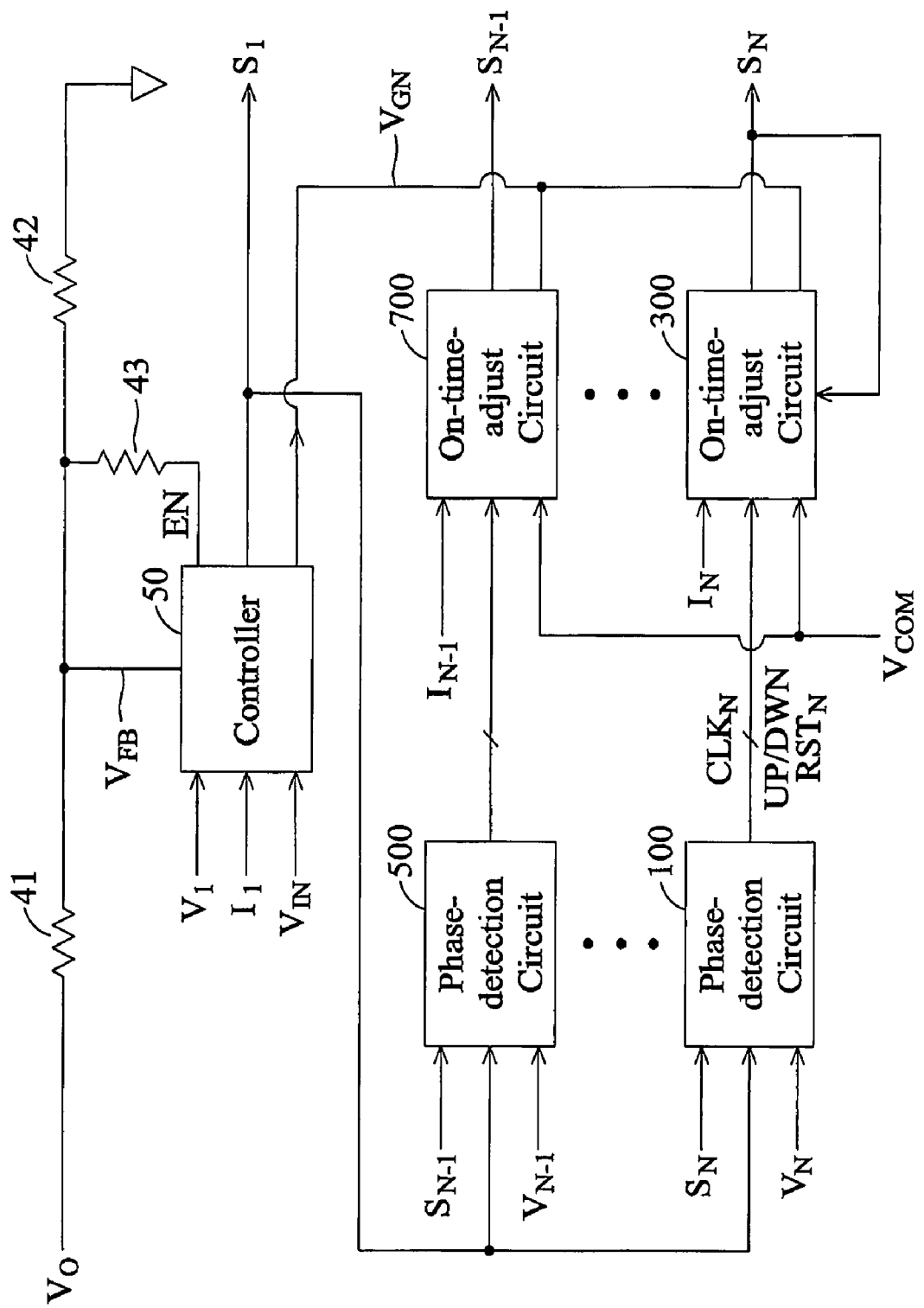
FIG. 2 shows a preferred embodiment of a switching control circuit for the multi-phases, multi-channels PFC converter according to the present invention.

FIG. 2 shows a preferred embodiment of a switching control circuit according to the present invention. The switching control circuit generates the first-switching signal $S_1$ and the second-switching signal $S_N$. The switching control circuit includes a controller 50, phase-detection circuits 100~500, on-time-adjust circuits 300~700. The controller 50 is coupled to the output of the PFC converter through resistors 41 and 42 to receive a feedback signal $V_{FB}$. The controller 50 is further coupled to the inductor 15 to receive the first-inductor signal $V_1$ through a resistor 17. The first-current signal $I_1$ and the input voltage $V_{IN}$ are also connected to the controller 50 for generating the first-switching signal $S_1$, an off signal $V_{GN}$ and a range signal EN. The range signal EN can further be connected to resistors 41 and 42 through a resistor 43 for programming the output voltage of the PFC converter. The first-switching signal $S_1$ is coupled to switch the inductor 15 for the power factor correction. The phase-detection circuit 100 is developed to generate a start signal $CLK_N$ and a phase-lock signal UP/DWN by detecting the first-switching signal $S_1$ and the second-inductor signal $V_N$. The start signal $CLK_N$ and the phase-lock signal UP/DWN are coupled to the on-time-adjust circuit 300. The start signal $CLK_N$ is utilized to enable the second-switching signal $S_N$. The second-switching signal $S_N$ is coupled to switch the inductor 35 shown in FIG. 1. The on-time-adjust circuit 300 is applied to adjust the on time of the second-switching signal $S_N$ in accordance with the phase-lock signal UP/DWN. The phase-lock signal UP/DWN is correlated to the period from the end of the second-inductor signal $V_N$ to the beginning of the start signal $CLK_N$. Therefore, the on time of the second-switching signal $S_N$ is adjusted to minimize the period from the disabling of the second-switching signal $S_N$ to the enabling of second-inductor signal $V_N$. The current of the inductor 35 will remain continuous if the transistor 30 is turned on instantly after the inductor 35 is demagnetized, which will achieve a high PF (power factor) and low THD (total harmonic distortion).

Figure 3:
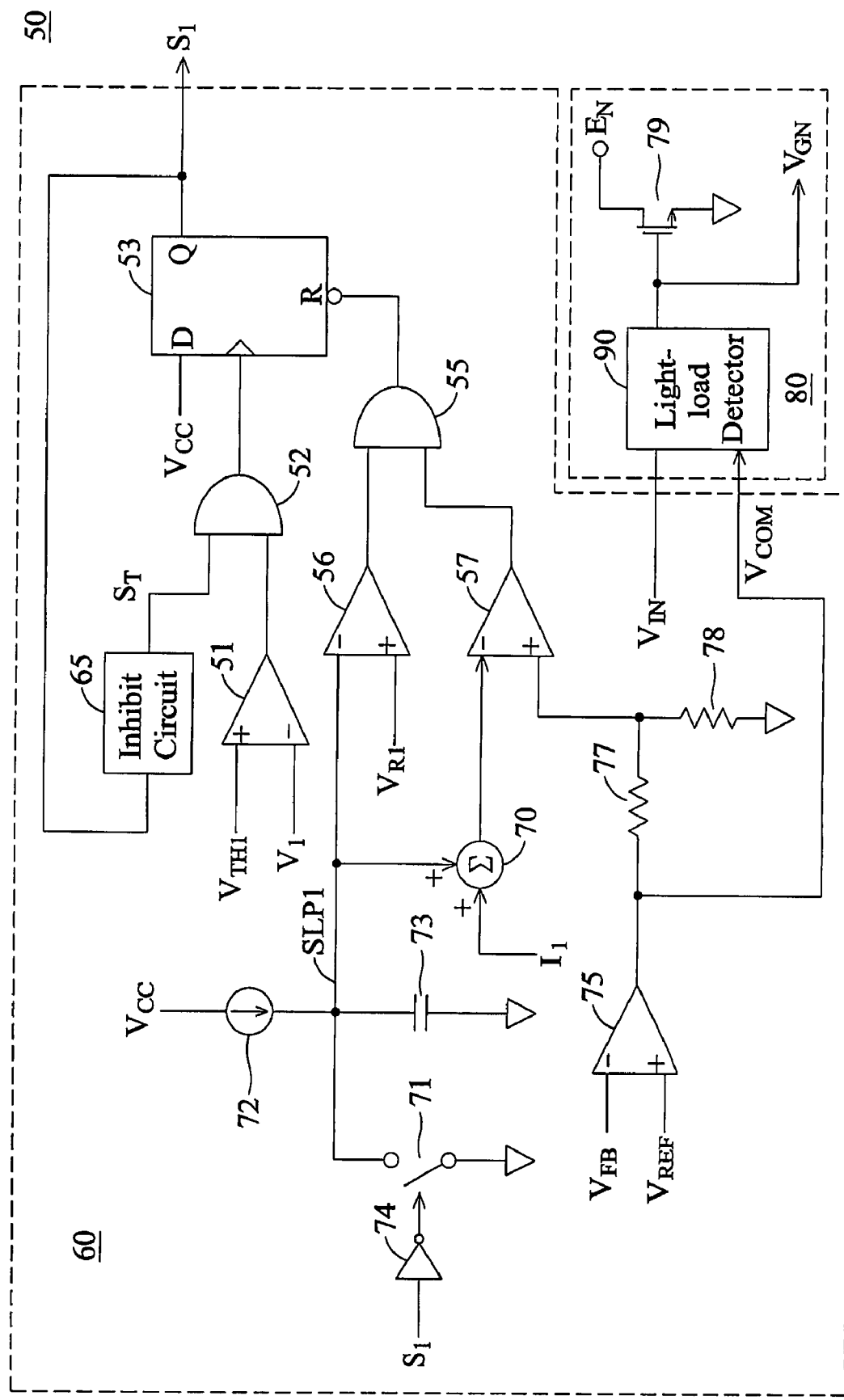
FIG. 3 shows a PFC-control circuit and a light-load detection circuit according to the preferred embodiment of present invention.

FIG. 3 shows a preferred embodiment of a controller 50 according to the present invention. The controller 50 includes a PFC-control circuit 60 and a light-load detection circuit 80. The light-load detection circuit 80 is coupled to the output the PFC converter through the PFC-control circuit 60 for generating the off signal $V_{GN}$ and the range signal EN in response to the feedback signal $V_{FB}$ and the input voltage $V_{IN}$. The off signal $V_{GN}$ is utilized to turn off the second-switching signal $S_N$ for power management. The range signal EN is coupled to program the output voltage of the PFC converter through the resistor 43 (shown in FIG. 2). If the output voltage $V_O$ of the PFC converter is decreased when the second-switching signal $S_N$ is turned off at the light load, then the hysteresis will be developed to prevent an abnormal oscillation at the output voltage $V_O$. The light-load detection circuit 80 includes a transistor 79 and a light-load detector 90. The light-load detector 90 generates the off signal $V_{GN}$ coupled to turn off the second-switching signal $S_N$. Besides, the off signal $V_{GN}$ is connected to the gate terminal of the transistor 79 for generating the range signal EN at the drain terminal of the transistor 79.

The PFC-control circuit 60 includes an error amplifier 75 having a reference signal $V_{REF}$, and a pulse width modulation (PWM) circuit generating the first-switching signal $S_1$ in response to the first-inductor signal $V_1$ and the error signal $V_{COM}$. The error amplifier 75 generates an error signal $V_{COM}$ in response to the feedback signal $V_{FB}$ and the reference signal $V_{REF}$. The error signal $V_{COM}$ associates with the first-inductor signal $V_1$ generating the first-switching signal $S_1$. The first-inductor signal $V_1$ is coupled to enable the first-switching signal $S_1$. The error signal $V_{COM}$ is utilized to control the on time of the first-switching signal $S_1$.

A switch 71, a current source 72, a capacitor 73 and an inverter 74 form a first ramp-signal generator for generating a slope signal SLP1 in response to the first-switching signal $S_1$. An adder 70 receives the slope signal SLP1 and the first-current signal $I_1$ for generating a first mixed signal coupled to the input of a comparator 57. The first-current signal $I_1$ is correlated to the switching current of the inductor 15. Another input of the comparator 57 is connected to receive the error signal $V_{COM}$ via resistors 77 and 78. The output of the comparator 57 is coupled to disable the first-switching signal $S_1$ in response to the comparison of the error signal $V_{COM}$ and the first mixed signal. Another comparator 56 is applied to disable the first-switching signal $S_1$ as well. The inputs of the comparator 56 are connected to the slope signal SLP1 and a threshold voltage $V_{R1}$. The first-switching signal $S_1$ is disabled once the slope signal SLP1 is higher than the threshold voltage $V_{R1}$. Therefore, the maximum on time of the first-switching signal $S_1$ is limited.

When the first-switching signal $S_1$ is turned off, a comparator 51 is coupled to enable the first-switching signal $S_1$ once the first-inductor signal $V_1$ is lower than a threshold signal $V_{TH1}$. A flip-flop 53 is used for generating the first-switching signal $S_1$. The first-inductor signal $V_1$ and the threshold signal $V_{TH1}$ are connected to the inputs of the comparator 51. The output of the comparator 51 is connected to enable the flip-flop 53 through an input of an AND gate 52. Another input of the AND gate 52 is connected to the first-switching signal $S_1$ through an inhibit circuit 65. The inhibit circuit 65 generates an inhibit signal $S_T$ to provide a propagation delay to initiate the first-switching signal $S_1$, which restricts the maximum frequency of the first-switching signal $S_1$.

Figure 4:
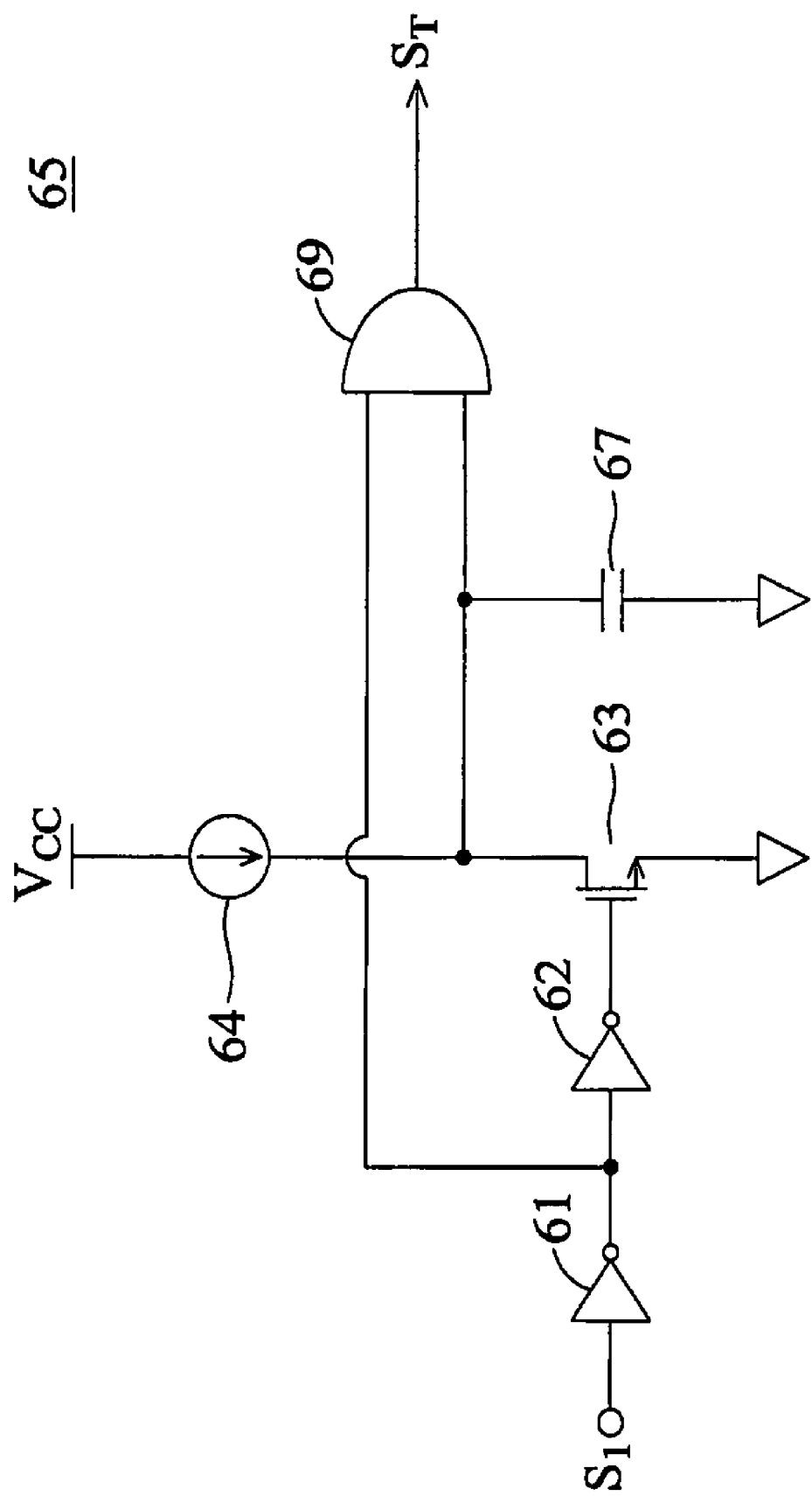
FIG. 4 shows a circuit schematic of a preferred embodiment of an inhibit circuit according to the present invention.

FIG. 4 shows a preferred embodiment of the circuit schematic of the inhibit circuit 65 according to the present invention. A current source 64 is utilized to charge a capacitor 67. A transistor 63 is connected to discharge the capacitor 67. The capacitor 67 is further connected to an AND gate 69. Another input of the AND gate 69 is coupled to the first-switching signal $S_1$ through an inverter 61. The inhibit signal $S_T$ is connected to an output of the AND gate 69. The output of the inverter 61 is further coupled to control the on/off of the transistor 63 via another inverter 62. The current of the current source 64 and the capacitance of the capacitor 67 determine the propagation delay.

Figure 5:
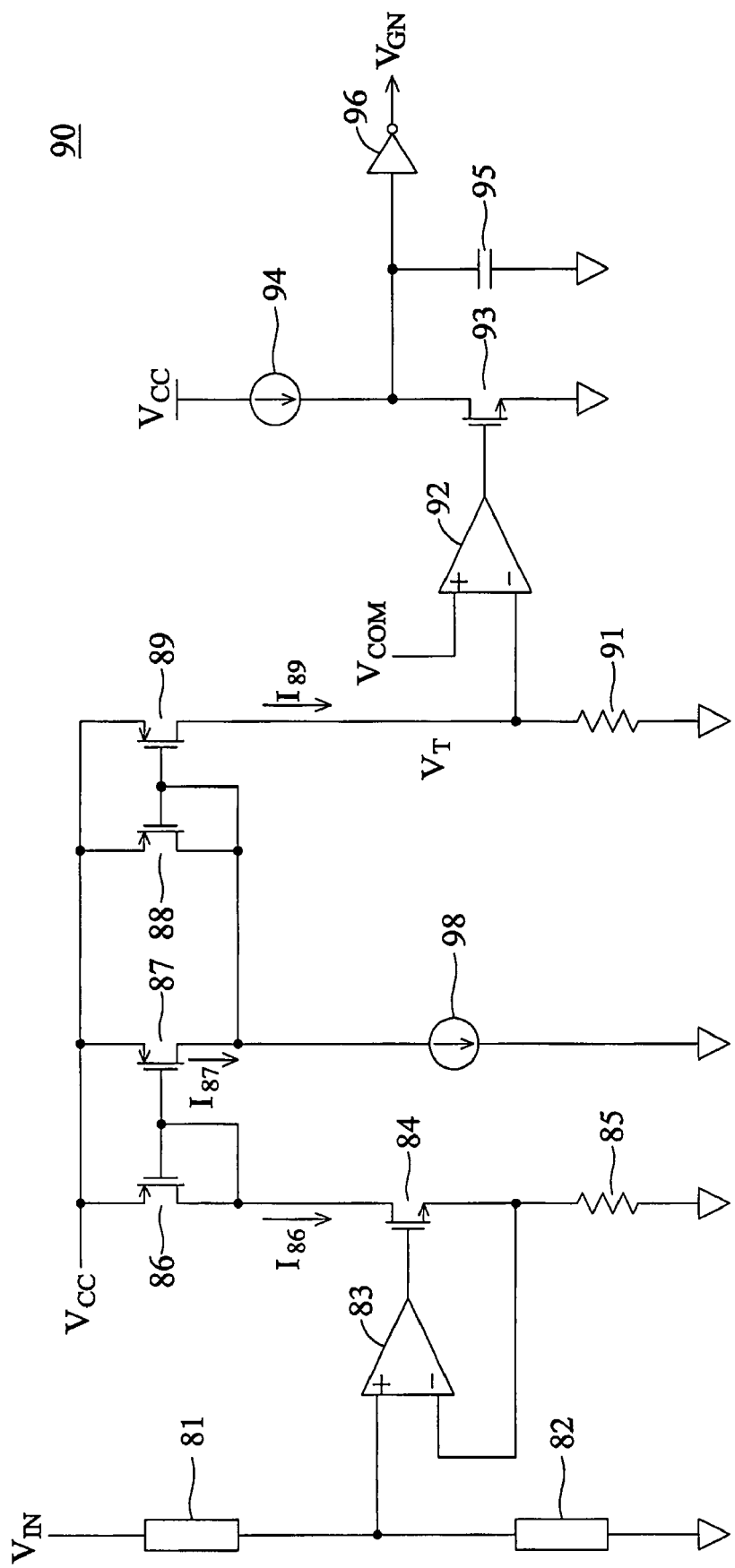
FIG. 5 shows a preferred embodiment of a light-load detector according to the present invention.

FIG. 5 shows a preferred embodiment of the light-load detector 90 according to the present invention. It includes an operational amplifier 83. The input of the operational amplifier 83 is coupled to the input of the PFC converter to detect the input voltage $V_{IN}$ through resistors 81 and 82. The operational amplifier 83, a transistor 84 and a resistor 85 develop a voltage-to-current converter to generate a current signal $I_{86}$ in response to the input voltage $V_{IN}$. Transistors 86 and 87 form a current mirror to receive the current signal $I_{86}$ for generating a current signal $I_{87}$. Transistors 88 and 89 form another current mirror connected to receive a constant current 98 and the current signal $I_{87}$ for generating a current signal $I_{89}$. The current signal $I_{89}$ is further connected to a resistor 91 to generate a threshold signal $V_T$. The threshold signal $V_T$ is thus correlated to the constant current 98 and the input voltage $V_{IN}$. The threshold signal $V_T$ is decreased in response to the increase of the input voltage $V_{IN}$. The threshold signal $V_T$ is connected to the input of a comparator 92. Another input of the comparator 92 is connected to the error signal $V_{COM}$. A current source 94, a transistor 93, a capacitor 95 and an inverter 96 form a debounce circuit to provide a debounce time for generating the off signal $V_{GN}$. The output of the comparator 92 is connected to generate off signal $V_{GN}$ through the debounce circuit. The debounce circuit prevents the noise interference. The current of the current source 94 and the capacitance of the capacitor 95 determine the debounce time. The off signal $V_{GN}$ is generated at the output of the inverter 96. Therefore, once the error signal $V_{COM}$ is lower than the threshold signal $V_T$, the off signal $V_{GN}$ can be generated after the debounce time.

Figure 6:
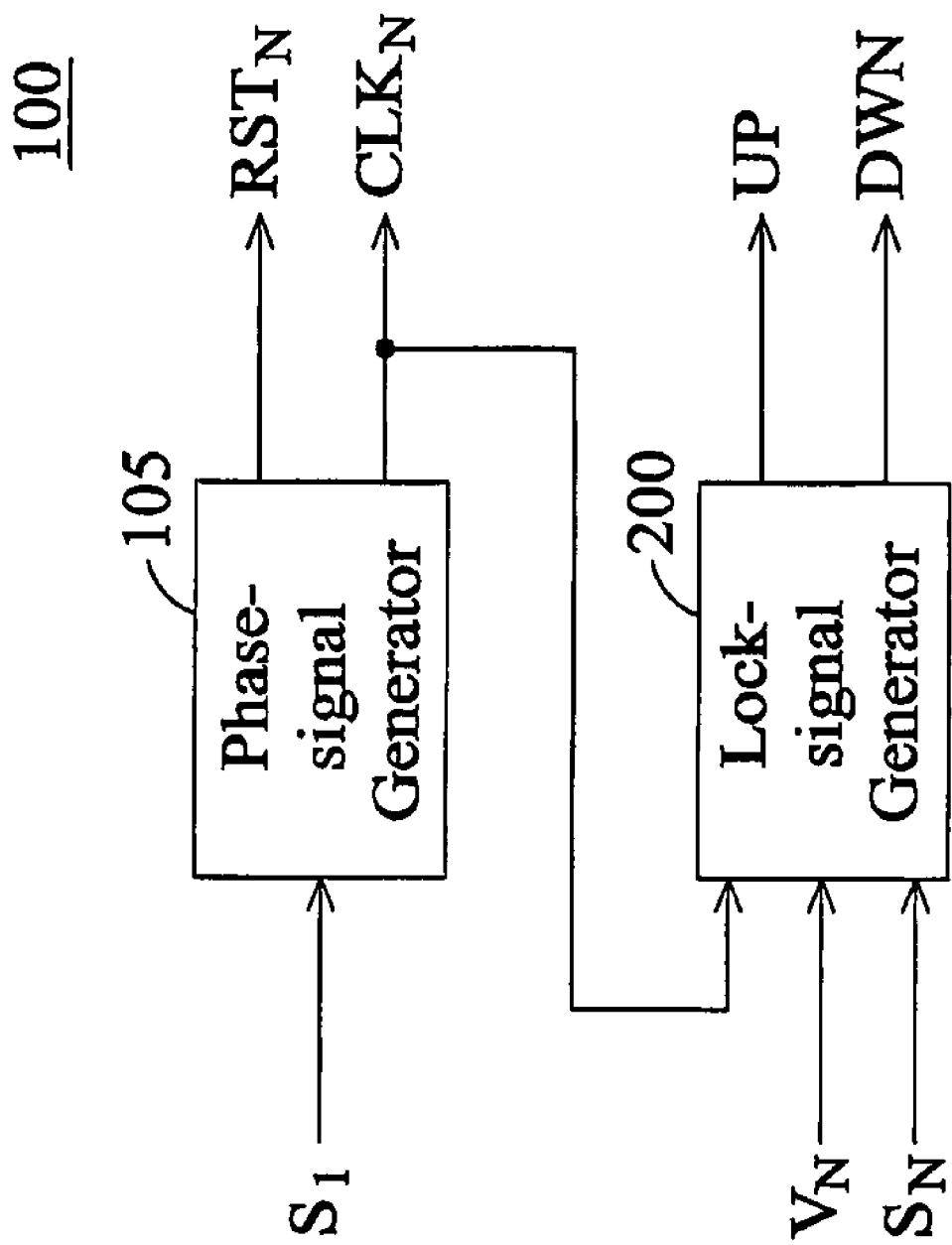
FIG. 6 shows a preferred embodiment of a phase-detection circuit according to the present invention.

FIG. 6 shows a preferred embodiment of the circuit schematic of the phase-detection circuit according to the present invention. It includes a phase-signal generator 105 and a lock-signal generator 200. The phase-signal generator 105 is used for generating the start signal $CLK_N$ and a reset signal $RST_N$ in accordance with the switching period of the first-switching signal $S_1$. The lock-signal generator 200 is used for generating the phase-lock signal UP/DWN in response to the second-inductor signal $V_N$, the second-switching signal $S_N$ and the start signal $CLK_N$. The start signal $CLK_N$ is generated after a phase shift of the first-switching signal $S_1$. The phase-lock signal UP/DWN is produced in accordance with the period between the end of the second-inductor signal $V_N$ and the start of the second-switching signal $S_N$.

Figure 7:
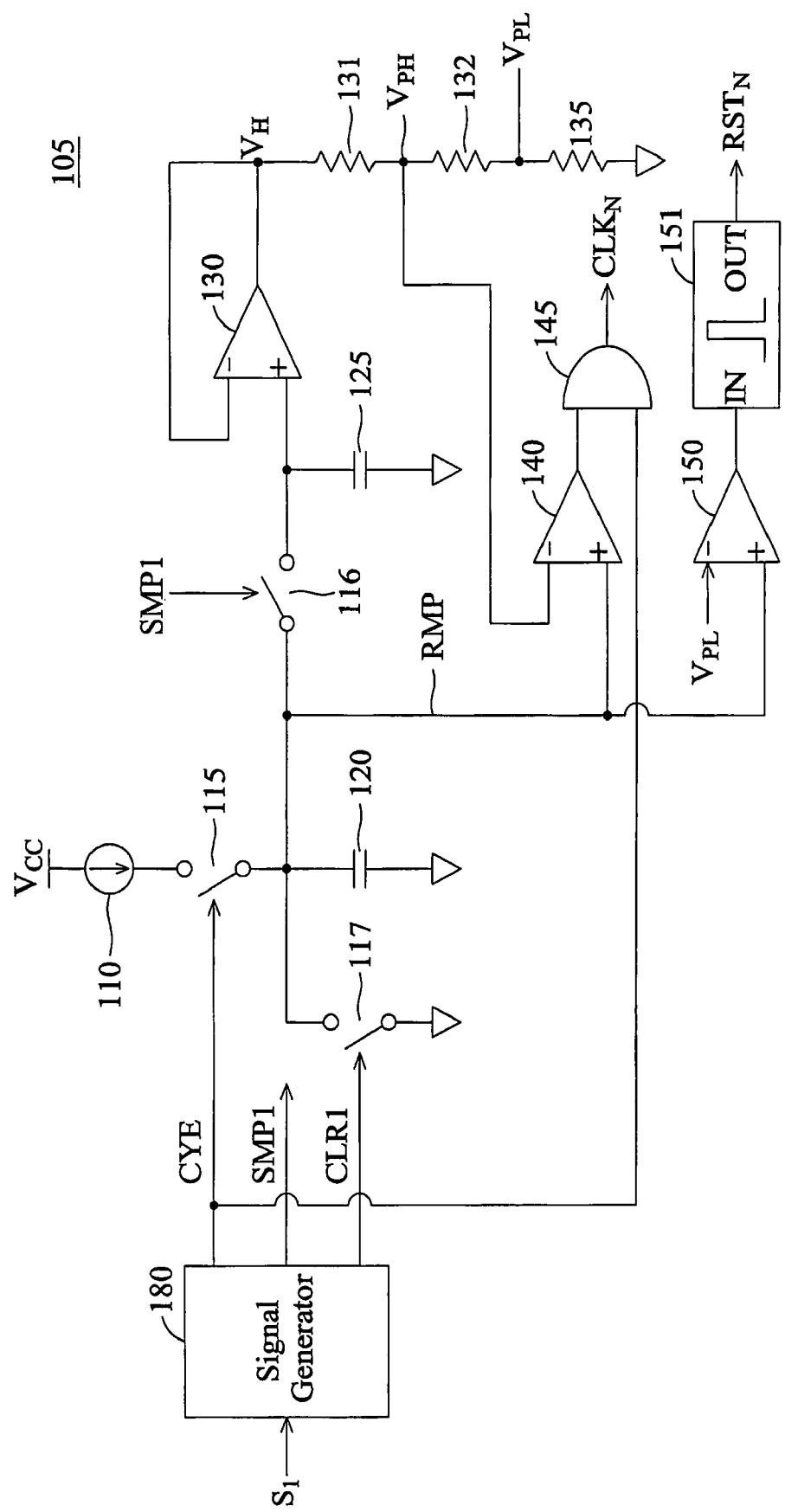
FIG. 7 shows a preferred embodiment of a phase-signal generator according to the present invention.

FIG. 7 shows a preferred embodiment of the phase-signal generator 105 according to the present invention. A current source 110, a capacitor 120 and switches 115 and 117 generate a ramp signal RMP in response to the first-switching signal $S_1$. A switch 116 is further connected from the ramp signal RMP to a capacitor 125. A signal generator 180 is coupled to receive the first-switching signal $S_1$ for generating a period signal CYE, a sampling signal SMP1 and a clear signal CLR1. The period signal CYE is proportional to the switching period of the first-switching signal $S_1$. It is connected to control the switch 115 for generating the ramp signal RMP. The sample signal SMP1 is connected to enable the switch 116 for sampling the voltage of the ramp signal RMP to the capacitor 125. The clear signal CLR1 is connected to the switch 117 to discharge the capacitor 120 and reset the ramp signal RMP. When the period of the first-switching signal $S_1$ is increased, the amplitude of the ramp signal RMP will be increased accordingly. The maximum voltage of the first-switching signal $S_1$ is sampled to the capacitor 125. The capacitor 125 is connected to a buffer amplifier 130 for generating a voltage signal $V_H$. Resistors 131, 132, and 135 forms a voltage divider connected to the voltage signal $V_H$ for producing voltage signals $V_{PH}$ and $V_{PL}$, in which the amplitude of the voltage signals is $V_H > V_{PH} > V_{PL}$. The voltage signal $V_{PL}$ is connected to the input of a comparator 150. Another input of the comparator is connected to the ramp signal RMP. The output of the comparator 150 is connected to a pulse generator 151 for generating the reset signal $RST_N$. The reset signal $RST_N$ is coupled to turn off the second-switching signal $S_N$. The voltage signal $V_{PH}$ is connected to the input of a comparator 140. Another input of the comparator 150 is connected to the ramp signal RMP. The output of the comparator 140 is connected to the input of an AND gate 145. Another input of the AND gate 145 is connected to the period signal CYE. The start signal $CLK_N$ is therefore generated at the output of the comparator 145. The reset signal $RST_N$ is generated before the generation of the start signal $CLK_N$.

Figure 8:
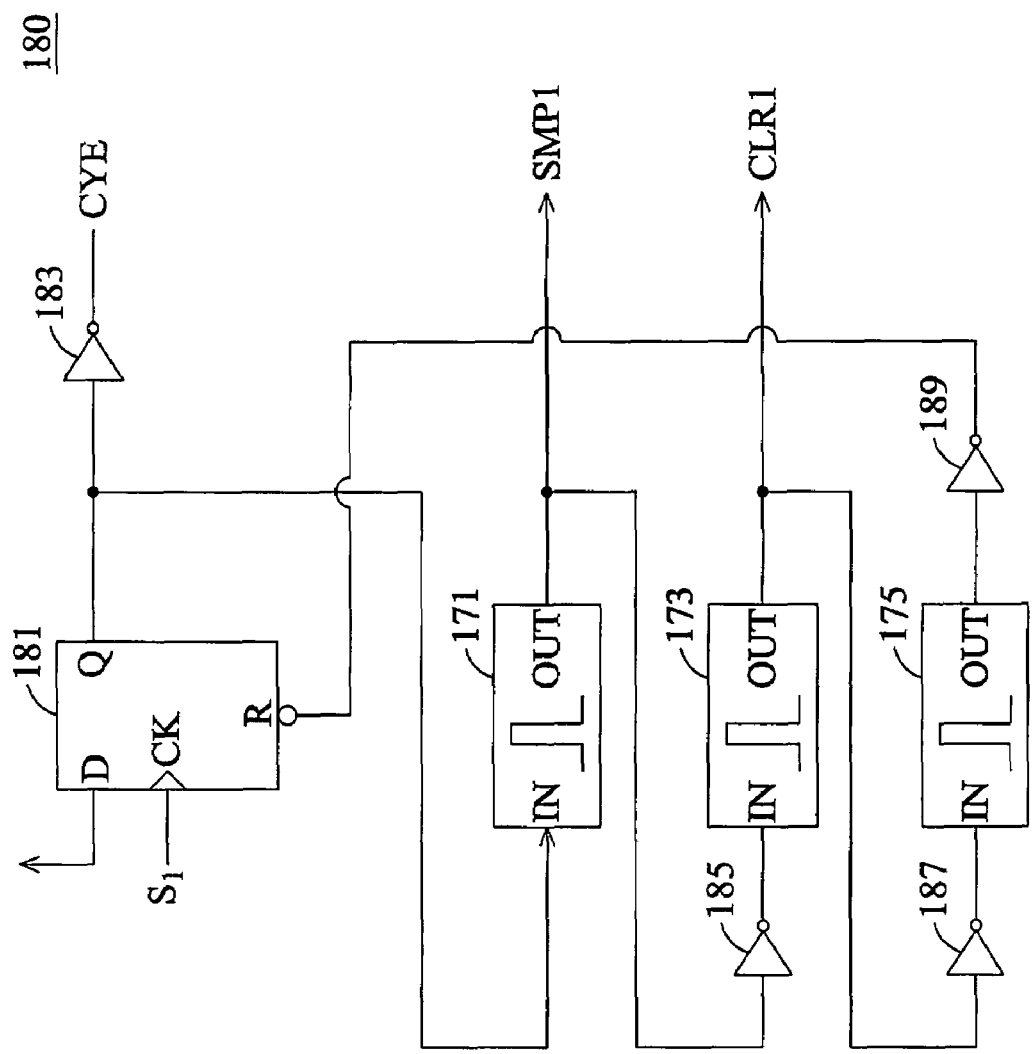
FIG. 8 shows a preferred embodiment of a signal generator according to the present invention.

FIG. 8 shows a preferred embodiment of the circuit schematic of the signal generator 180 according to the present invention. The first-switching signal $S_1$ is connected to enable a flip-flop 181. The period signal CYE is produced at the output of the flip-flop 181 via an inverter 183. The output of the flip-flop 181 is further connected to a pulse generator 171 for producing the sample signal SMP1. The sample signal SMP1 is connected to another pulse generator 173 through an inverter 185 for generating the clear signal CLR1. The clear signal CLR1 is further connected to a pulse generator 175 through an inverter 187. The output of the pulse generator 175 is coupled to reset the flip-flop 181 via an inverter 189.

Figure 9:
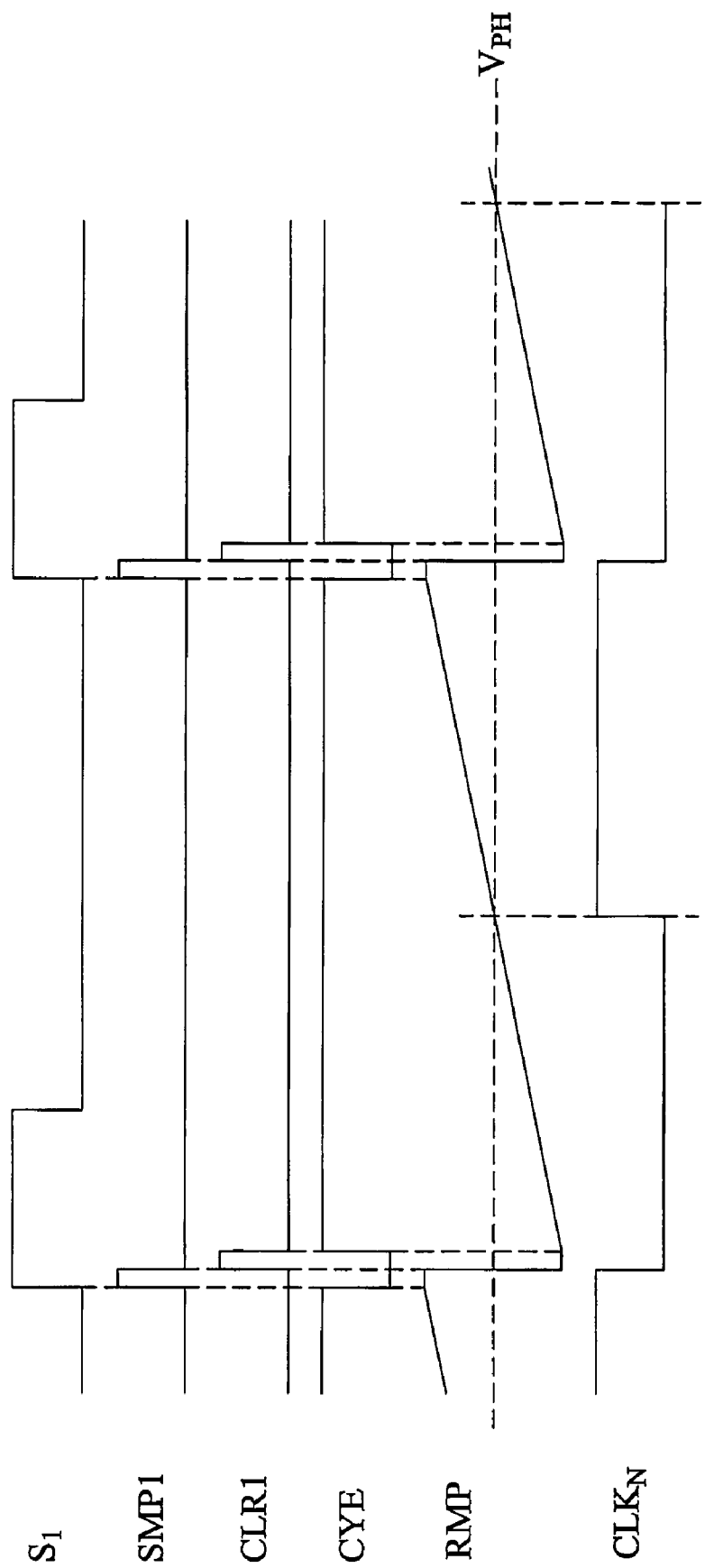
FIG. 9 shows key waveforms of the control circuit according to the present invention.

FIG. 9 shows signal waveforms according to the present invention. The period signal CYE, the sample signal SMP1 and the clear signal CLR1 are generated in response to the enabling of the first-switching signal $S_1$. The clear signal CLR1 is generated after the sample signal SMP1. The ramp signal RMP is generated in response to the period signal CYE. The start signal $CLK_N$ is enabled once the ramp signal RMP is higher than the voltage signal $V_{PH}$. The start signal $CLK_N$ is generated after a phase shift of the first-switching signal $S_1$.

Figure 10:
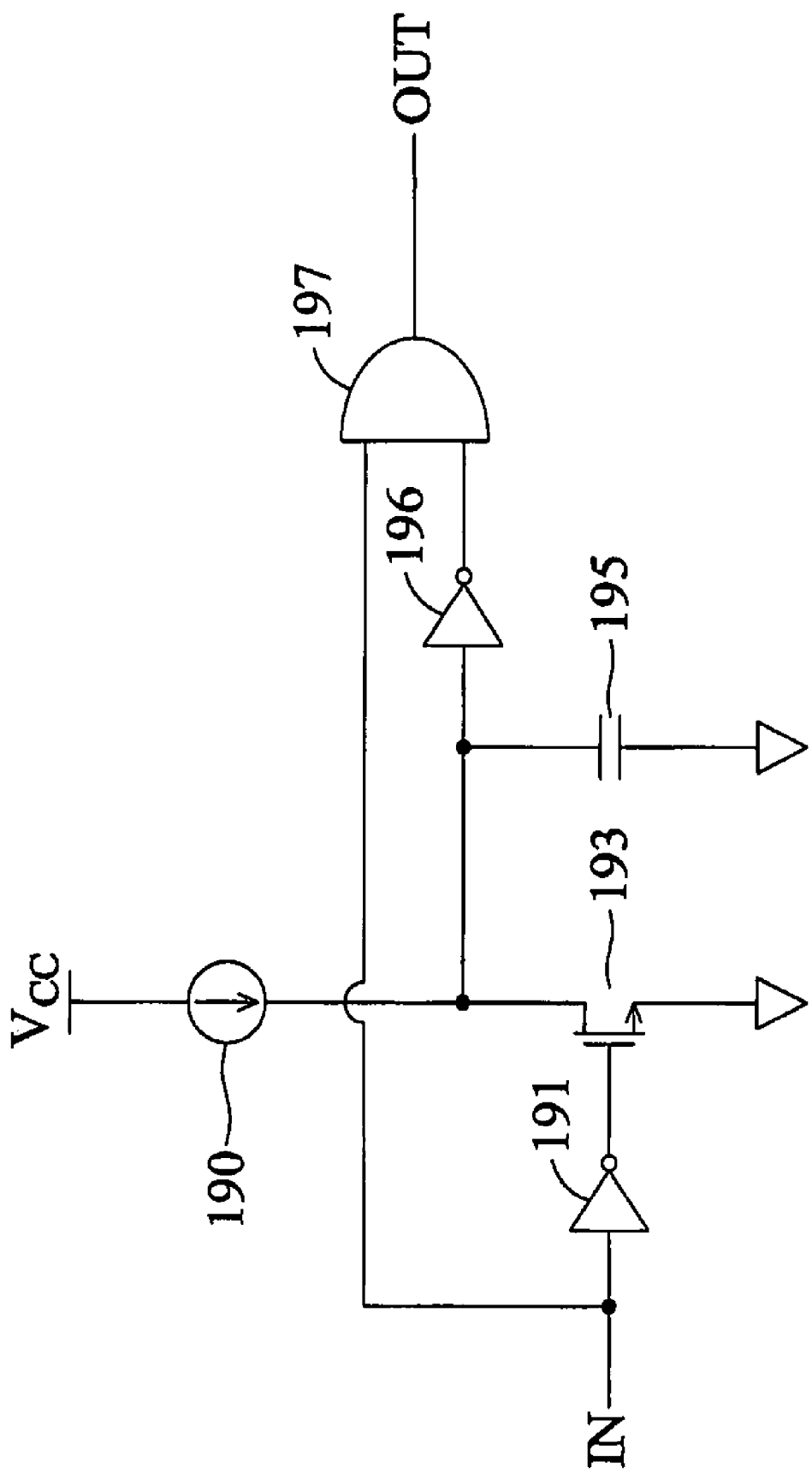
FIG. 10 shows a preferred embodiment of a pulse-signal generator according to the present invention.

FIG. 10 shows a preferred embodiment of the circuit schematic of the pulse generator according to the present invention. A current source 190 is utilized to charge a capacitor 195. A transistor 193 is connected to discharge the capacitor 195. The capacitor 195 is connected to an AND gate 197 via an inverter 196. Another input of the AND gate 197 is coupled to the input of the pulse generator. The input of pulse generator is further coupled to control the on/off of the transistor 193 via another inverter 191. Therefore a pulse signal will be generated in response to the enabling of the signal at the input of the pulse generator. The pulse width of the pulse signal is determined by the current of the current source 190 and the capacitance of the capacitor 195.

Figure 11:
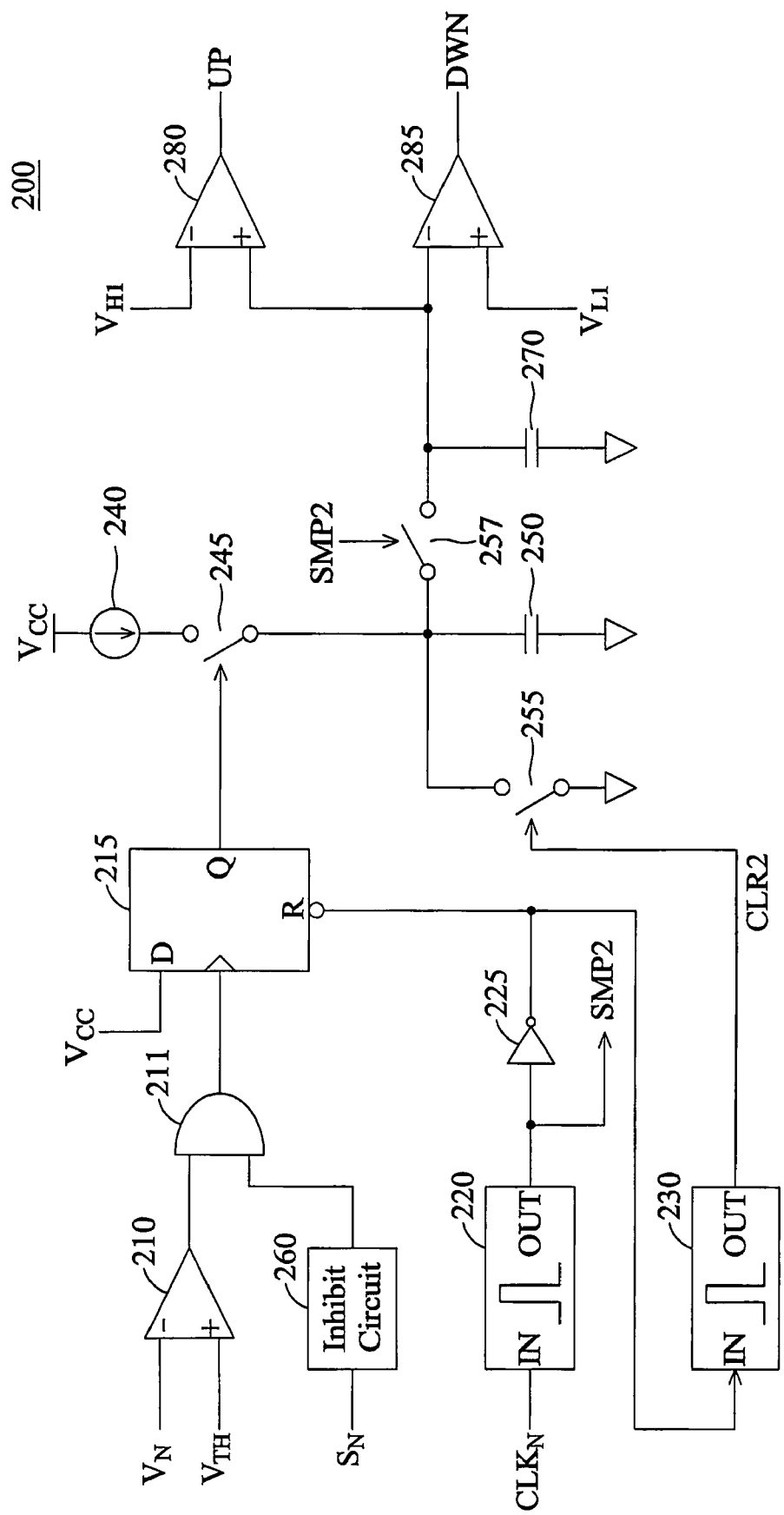
FIG. 11 shows a preferred embodiment of a lock-signal generator according to the present invention.

FIG. 11 is a preferred embodiment of the lock-signal generator 200 according to the present invention. When the second-switching signal $S_N$ is turned off, a comparator 210 is coupled to generate a charge signal once the second-inductor signal $V_N$ is lower than a threshold signal $V_{TH}$. A flip-flop 215 generates the charge signal. The second-inductor signal $V_N$ and the threshold signal $V_{TH}$ are connected to the inputs of the comparator 210. The output of the comparator 210 is connected to enable the flip-flop 215 through an AND gate 211. Another input of the AND gate 211 is connected to the second-switching signal $S_N$ through an inhibit circuit 260. The start signal $CLK_N$ is connected to a pulse generator 220 to generate a sample signal SMP2. The sample signal SMP2 is further connected to disable the charge signal by resetting the flip-flop 215 via an inverter 225. The output of the inverter 225 is connected to another pulse generator 230 for producing a clear signal CLR2.

A current source 240, a capacitor 250 and switches 245, 255 generate a differential signal in response to the charge signal. A switch 257 is further connected from the differential signal to a capacitor 270. The charge signal is connected to control the switch 245 for generating the differential signal. The sample signal SMP2 is connected to control the switch 257 for sampling the voltage of the differential signal to the capacitor 270. The clear signal CLR2 is connected to the switch 255 to discharge the capacitor 250 and reset the differential signal. Assign a phase-delay to represent the period from the disabling of the second-inductor signal $V_N$ to the enabling of the second-switching signal $S_N$. When the phase-delay is increased, the amplitude of the differential signal will be increased accordingly. The maximum voltage of the differential signal is sampled to the capacitor 270. The capacitor 270 is further connected to comparators 280 and 285 for generating the phase-lock signal UP/DWN. Therefore, the phase-lock signal UP/DWN is produced in accordance with the period between the disabling of the second-inductor signal $V_N$ and the enabling of the second-switching signal $S_N$. The phase-lock signal UP/DWN will be UP state for increasing the on time of the second-switching signal $S_N$ when the differential signal is higher than a threshold $V_{H1}$. The phase-lock signal UP/DWN will be DWN state to decrease the on time of the second-switching signal $S_N$ when the differential signal is lower than a threshold $V_{L1}$.

Figure 12:
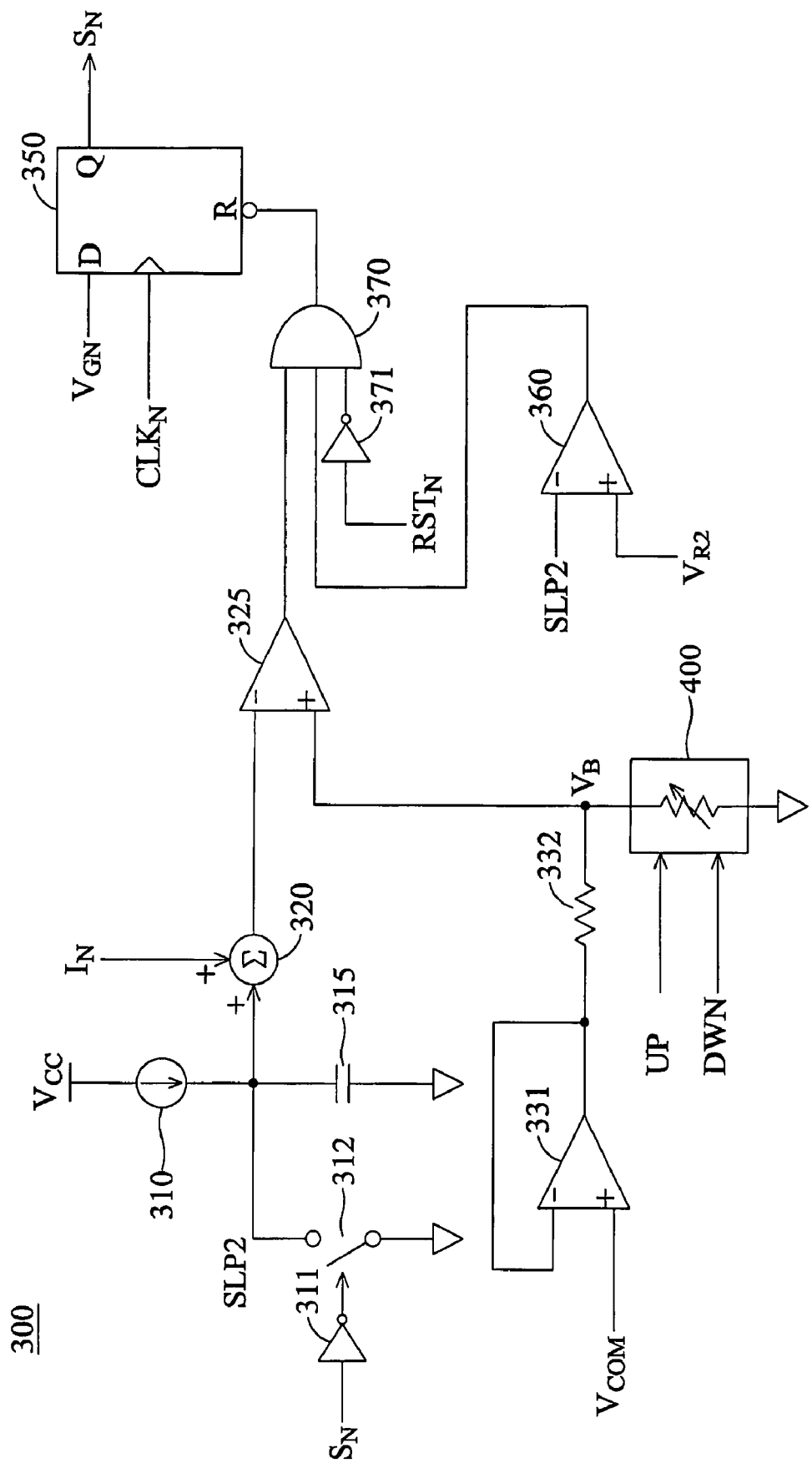
FIG. 12 shows a preferred embodiment of an on-time-adjust circuit according to the present invention.

FIG. 12 is a preferred embodiment of the on-time-adjust circuit according to the present invention. It includes a flip-flop 350 coupled to enable the second-switching signal $S_N$ in response to the start signal $CLK_N$. The off signal $V_{GN}$ is connected to D-input of the flip-flop 350 to disable the second-switching signal $S_N$ during the light load condition. A switch 312, a current source 310, a capacitor 315 and an inverter 311 develop a second-ramp-signal generator for generating a second-ramp signal SLP2 in response to the enabling of the second-switching signal $S_N$. An adder 320 receives the second-ramp signal SLP2 and the second-current signal $I_N$ for generating a second mixed signal coupled to the input of a comparator 325. The second-current signal $I_N$ is correlated to the switching current of the inductor 35. Another input of the comparator 325 is connected to receive the error signal $V_{COM}$ via a buffer amplifier 331, a resistor 332 and an attenuator 400. The attenuator 400 generates an attenuated signal $V_B$ by attenuating the error signal $V_{COM}$. Through an AND gate 370, the output of the comparator 325 is coupled to disable the second-switching signal $S_N$ in response to the comparison of the attenuated signal $V_B$ and the second mixed signal. Another comparator 360 is applied to disable the second-switching signal $S_N$ through the AND gate 370. The inputs of the comparator 360 are connected to the second-ramp signal SLP2 and a threshold voltage $V_{R2}$. The second-switching signal $S_N$ is disabled once the second-ramp signal SLP2 is higher than the threshold voltage $V_{R2}$, which limits the maximum on time of the second-switching signal $S_N$. Furthermore, another input of the AND gate 370 is coupled to the reset signal $RST_N$ via an inverter 371. The reset signal $RST_N$ is generated before the generation of the start signal $CLK_N$, the second-switching signal $S_N$ is thus turned off before the enabling of the start signal $CLK_N$, which further limits the maximum duty cycle of the second-switching signal $S_N$. The phase-lock signal UP/DWN is coupled to control the attenuation of the attenuator 400 and control the on time of the second-switching signal $S_N$.

Figure 13:
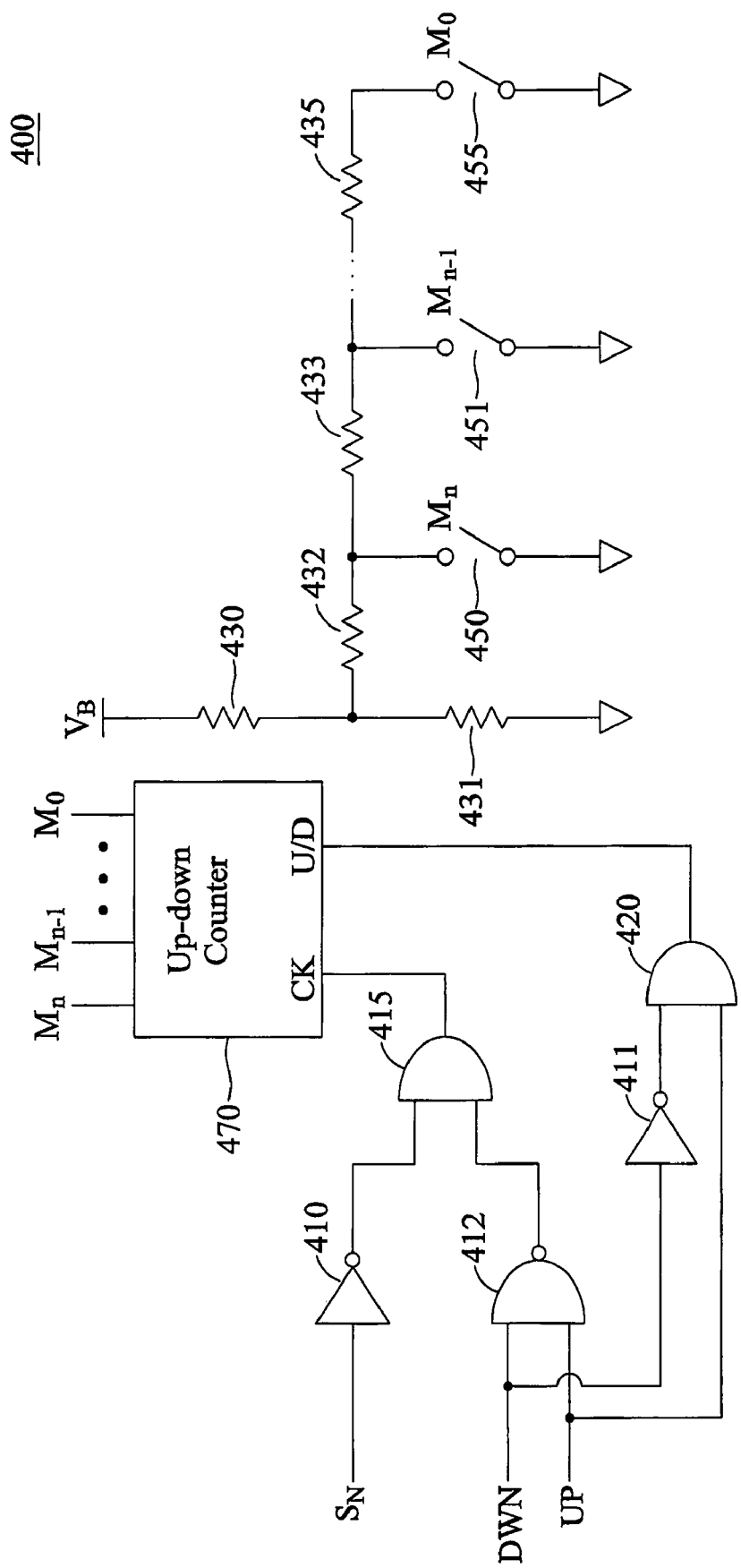
FIG. 13 shows a circuit schematic of a preferred embodiment of an attenuator according to the present invention.

FIG. 13 is a circuit schematic of the attenuator 400 according to the present invention. It includes resistors network formed by resistors 430~435 and switches 450~455. The switches 450~455 are controlled by an up-down counter 470.

Figure 14:
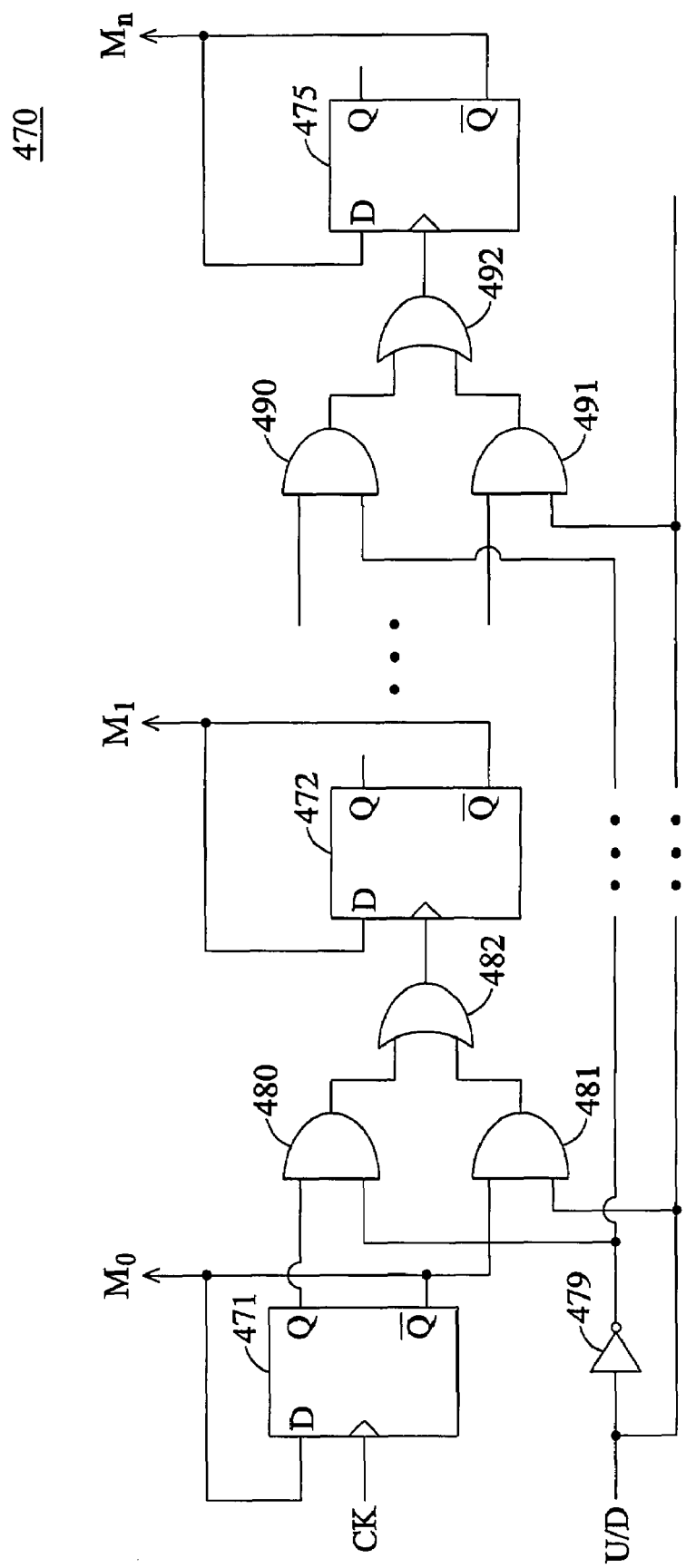
FIG. 14 shows a circuit schematic of a preferred embodiment of an up-down counter according to the present invention.

Inverters 410, 411, AND gates 415, 420 and NOR gate 412 develop a logic circuit to control the up-count or the down-count of the up-down counter in response to the second-switching signal $S_N$ and the phase-lock signal UP/DWN. The resistance of the attenuator 400 is increased in response to the up count of the up-down counter 470 when the phase-lock signal UP/DWN is in UP state. The increase of the resistance of the attenuator 400 will increase the attenuated signal $V_B$. The increase of the attenuated signal $V_B$ will increase the on time of the second-switching signal $S_N$. FIG. 14 shows the circuit schematic of the up-down counter 470. It is developed by flip-flops 471~475, AND gates 480~491 and OR gates 482~492.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A switching control circuit for a power factor correction (PFC) converter, comprising:
   a PFC-control circuit coupled to a first inductor and the output of the PFC converter to receive a first-inductor signal and a feedback signal for generating a first-switching signal, wherein the first-switching signal is coupled to switch the first inductor for power factor correction, wherein the first-inductor signal is correlated to the demagnetization of the first inductor;
   a phase-detection circuit coupled to detect the first-switching signal and a second-inductor signal for generating a start signal and a phase-lock signal, wherein the start signal is utilized to enable a second-switching signal, and the second-switching signal is coupled to switch a second inductor, wherein the second-inductor signal is correlated to the demagnetization of the second inductor, the first inductor and the second inductor are coupled to the output of the PFC converter;
   an on-time-adjust circuit coupled to adjust the on time of the second-switching signal in accordance with the phase-lock signal; and
   a light-load detection circuit generating an off signal and a range signal in response to the feedback signal, wherein the phase-lock signal is correlated to the period between of the second-inductor signal and the start signal, the off signal is utilized to turn off the second-switching signal, and the range signal is coupled to program the output voltage of the PFC converter.

2. The switching control circuit as claimed in claim 1, wherein the start signal is generated in accordance with the switching period of the first-switching signal.

3. The switching control circuit as claimed in claim 1, wherein the on-time-adjust circuit is developed to adjust the on time of the second-switching signal for minimizing the period between the end of the second-inductor signal and the start of the start signal.

4. The switching control circuit as claimed in claim 1, wherein the PFC-control circuit comprises:
   an error amplifier generating an error signal in response to the feedback signal; and
   a pulse width modulation (PWM) circuit generating the first-switching signal in response to the first-inductor signal and the error signal, wherein the first-inductor signal is coupled to enable the first-switching signal, and the error signal is utilized to determine the on time of the first-switching signal.

5. The switching control circuit as claimed in claim 4, wherein the PWM circuit comprises:
   a first ramp-signal generator generating a slope signal in response to the enabling of the first-switching signal;
   an adder generating a first mixed signal in accordance with a first-current signal and the slope signal, wherein the first-current signal is correlated to a switching current of the first inductor;
   a first comparator coupled to enable the first-switching signal in response to the comparison of the first-inductor signal and a threshold signal; and
   a second comparator coupled to disable the first-switching signal in response to the comparison of the error signal and the first mixed signal.

6. The switching control circuit as claimed in claim 1, wherein the phase-detection circuit comprises:
   a phase-signal generator generating the start signal in accordance with the switching period of the first-switching signal, wherein the start signal is generated after a phase shift of the first-switching signal; and
   a lock-signal generator generating the phase-lock signal in response to the second-inductor signal and the second-switching signal, wherein the phase-lock signal is produced in accordance with the period between the end of the second-inductor signal and the start of the second-switching signal.

7. The switching control circuit as claimed in claim 1, wherein the on-time-adjust circuit comprises:
   a flip-flop coupled to enable the second-switching signal in response to the start signal;
   a second-ramp-signal generator generating a second-ramp signal in response to the second-switching signal;
   an attenuator producing an attenuated signal by attenuating the error signal;
   an adder generating a second mixed signal in accordance with the second-ramp signal and a second-current signal; and
   a third comparator coupled to disable the second-switching signal in response to the comparison of the attenuated signal and the second mixed signal, wherein the phase-lock signal is coupled to control the attenuation of the attenuator and control the on time of the second-switching signal.

8. A control circuit for a power factor correction (PFC) converter, comprising:
   a PFC-control circuit coupled to a first inductor and the output of the PFC converter to receive a first-inductor signal and a feedback signal for generating a first-switching signal; in which the first-switching signal is coupled to switch the first inductor for power factor correction, wherein the first-inductor signal is correlated to the demagnetization of the first inductor;
   a phase-detection circuit coupled to detect the first-switching signal and a second-inductor signal for generating a start signal and a phase-lock signal; in which the start signal is utilized to enable a second-switching signal; the second-switching signal is coupled to switch a second inductor, wherein the second-inductor signal is correlated to the demagnetization of the second inductor; and
   an on-time-adjust circuit coupled to adjust the on time of the second-switching signal in accordance with the phase-lock signal.

9. The control circuit as claimed in claim 8, further comprising a light-load detection circuit coupled to the output the PFC converter for generating an off signal in response to the feedback signal, wherein the off signal is utilized to turn off the second-switching signal.

10. The control circuit as claimed in claim 9, wherein the light-load detection circuit further generates a range signal coupled to program the output voltage of the PFC converter in response to the off signal.

11. The control circuit as claimed in claim 9, wherein the light-load detection circuit is further coupled to the input of the PFC converter to detect the input voltage for generating a threshold signal, and the threshold signal is utilized to generate the off signal.

12. The control circuit as claimed in claim 8, wherein the second-switching signal is turned off before the enabling of the start signal, which determines the maximum duty cycle of the second-switching signal.

13. The control circuit as claimed in claim 8, wherein the start signal is generated in accordance with the switching period of the first-switching signal.

14. The control circuit as claimed in claim 8, wherein the on-time-adjust circuit is developed to adjust the on time of the second-switching signal for minimizing the period between the disabling of the second-inductor signal and the enabling of the start signal.

15. The control circuit as claimed in claim 8, wherein the PFC-control circuit comprises:
   an error amplifier generating an error signal in response to the feedback signal; and
   a pulse width modulation (PWM) circuit generating the first-switching signal in response to the first-inductor signal and the error signal, wherein the first-inductor signal is coupled to enable the first-switching signal, and the error signal is utilized to determine the on time of the first-switching signal.

16. The control circuit as claimed in claim 15, wherein the PWM circuit comprises:
   a first ramp-signal generator generating a slope signal in response to the enabling of the first-switching signal;
   an adder generating a first mixed signal in accordance with a first-current signal and the slope signal, wherein the first-current signal is correlated to the switching current of the first inductor;
   a first comparator coupled to enable the first-switching signal in response to the comparison of the first-inductor signal and a threshold signal; and
   a second comparator coupled to disable the first-switching signal in response to the comparison of the error signal and the first mixed signal.

17. The control circuit as claimed in claim 8, wherein the phase-detection circuit comprises:
   a phase-signal generator generating the start signal in accordance with the switching period of the first-switching signal; and
   a lock-signal generator generating the phase-lock signal in response to the second-inductor signal and the second-switching signal, wherein the start signal is generated after a phase shift of the first-switching signal, and the phase-lock signal is produced in accordance with the period between the disabling of the second-inductor signal and the enabling of the second-switching signal.

18. The control circuit as claimed in claim 8, wherein the on-time-adjust circuit comprises:
   a flip-flop coupled to enable the second-switching signal in response to the start signal;
   a second-ramp-signal generator generating a second-ramp signal in response to the second-switching signal;

an attenuator producing an attenuated signal by attenuating the error signal;

an adder generating a second mixed signal in accordance with the second-ramp signal and a second-current signal; and a third comparator coupled to disable the second-switching signal in response to the comparison of the attenuated signal and the second mixed signal, wherein the phase-lock signal is coupled to control the attenuation of the attenuator and control the on time of the second-switching signal.

19. A method for controlling a power factor correction (PFC) converter, comprising:

generating a first-switching signal in response to a first-inductor signal and a feedback signal, wherein the first-switching signal is coupled to switch a first inductor for power factor correction, wherein the feedback signal is correlated to the output of the PFC converter, the first-inductor signal is correlated to the demagnetization of the first inductor;

generating a second-switching signal in response to a phase-lock signal, wherein the second-switching signal is coupled to switch a second inductor; and generating the phase-lock signal in accordance with a second-inductor signal and the second-switching signal, wherein the phase-lock signal is coupled to control the on time of the second-switching signal, wherein the second-inductor signal is correlated to the demagnetization of the second inductor, and both the first inductor and the second inductor are connected to the output of PFC converter.

20. The method for controlling a PFC converter as claimed in claim 19, further comprising generating a start signal in accordance with the first-switching signal; the start signal is coupled to enable the second-switching signal, wherein the start signal is generated after a phase shift of the first-switching signal.

21. The method for controlling a PFC converter as claimed in claim 19, further comprising:

generating an off signal to turn off the second-switching signal in response to the feedback signal; and generating a range signal coupled to program the output voltage of the PFC converter in response to the feedback signal.

22. The method for controlling a PFC converter as claimed in claim 21, wherein the off signal and the range signal are generated by comparing the feedback with a threshold signal, and the threshold signal is correlated to the input voltage.

23. The method for controlling a PFC converter as claimed in claim 19, wherein the second-switching signal is turned off before the enabling of the start signal, which determines the maximum duty cycle of the second-switching signal.

24. The method for a controlling PFC converter as claimed in claim 19, wherein the phase-lock signal is utilized to adjust the on time of the second-switching signal for minimizing the period between the disabling of the second-inductor signal and the enabling of the second-switching signal.

* * * * *